United States Patent Office 3,769,269
Patented Oct. 30, 1973

3,769,269
NUCLEATION OF NORMALLY CRYSTALLINE VINYLIDENE CHLORIDE POLYMERS
Henry N. Beck, Walnut Creek, Calif., and Harvey D. Ledbetter and John A. Schmitt, Midland, Mich., assignors to The Dow Chemical Company, Midland, Mich.
No Drawing. Filed Sept. 5, 1972, Ser. No. 286,172
Int. Cl. C08f 3/28
U.S. Cl. 260—91.7    4 Claims

ABSTRACT OF THE DISCLOSURE

Normally crystalline vinylidene chloride polymers containing at least about 70 percent by weight of vinylidene chloride with any remainder being vinyl chloride are admixed with minor amounts of a compound selected from the group consisting of melamine, trichloromelamine, 5,6-dichlorobenzimidazole, 2 - phenylbenzimidazole, 6 - nitrobenzimidazole, 6-nitrobenzimidazole sodium salt and 6-nitroindazole, among other compounds, to provide improved crystallization rates.

BACKGROUND

The normally crystalline copolymers of vinylidene chloride have found wide acceptance as coating materials because of their many desirable properties including the ability to be heat sealed, transparency, inertness and low water vapor transmission rates. Specifically, polymers containing at least about 70 percent by weight of vinylidene chloride have been found to provide highly satisfactory coating materials for such substrates as regenerated cellulose film, paper, and thermoplastic films such as polyolefins and the like. The polymeric materials are applied to the substrate by well-known coating procedures, generally either in organic solvent solutions or in the form of aqueous lactices. The resultant coatings, after removal of solvent or water, are in an amorphous state and must be permitted to crystallize before the coated substrate is used. The time required for the coating to crystallize is generally quite long, i.e., in the order of from about 1 to 15 hours at temperatures of about 60° C. Accordingly, the production of coated substances utilizing such polymeric compositions are not generally adapted to high speed fabricating operations.

It is known to accelerate the rate of crystallization of such polymers by the addition of certain plasticizers. Many such plasticizers, however, increase the moisture vapor transmission rate and also present problems of extraction in food products contacting the same. It is also known to accelerate the rate of crystallization of such polymers by the addition thereto of vinylidene chloride polymers having a crystallization induction period less than that of said starting vinylidene chloride polymer as disclosed in U.S. Pat. 3,240,742. The resulting compositions, however, often have significantly differing physical properties which, in many cases, may not be desired. U.S. Pat. 3,367,926 also discloses a large variety of compounds which are useful as nucleating agents in a variety of thermoplastic crystalline polymers including crystallizable vinylidene chloride polymers.

SUMMARY OF THE INVENTION

Normally crystalline copolymers of vinylidene chloride, containing at least about 70 percent by weight of vinylidene chloride with any remainder being vinyl chloride, having desirably enhanced rates of crystallization are obtained by preparation of compositions containing from about 0.005 to 5 percent, by weight of such polymers, of a compound selected from the group set forth in the following Table I, and mixtures thereof.

DESCRIPTION OF THE PREFERRED EMBODIMENTS

The normally crystalline copolymers of vinylidene chloride include any such copolymer containing at least about 70 percent by weight of vinylidene chloride with any remainder being vinyl chloride.

Nucleating agents useful in the practice of the present invention are set forth in the following Table I. Each of the compounds in Table I is identified by the numerals in parentheses. Such designation will hereinafter be employed to identify the compounds.

TABLE I (1) Aluminum (III) chelate of 5,7-diiodo-8-quinolinol
(2) Aluminum (III) chelate of 8-hydroxy-5-iodo-quinoline
(3) Sodium p-pyridylhydroxymethane sulfonate
(4) Sodium 4,4′bibenzyldicarboxylate
(5) Copper (II) chelate of 8-quinolinol-formaldehyde copolymer
(6) Sodium maleate
(7) Sodium 12-hydroxyoctadecanoate
(8) Sodium cyclobutanecarboxylate
(9) Aluminum monobenzoate
(10) Potassium p-fluorobenzenesulfonate
(11) Benzenepentacarboxylic acid
(12) 4,5-dihydroxy-m-benzenedisulfonic acid disodium salt
(13) Melamine
(14) 2-aminophenol-4-sulfonic acid
(15) 8-quinolinesulfonic acid
(16) 4-chloroaniline-3-sulfonic acid
(17) 4-hydroxy-2-methylquinoline
(18) Alizarin Yellow G
(19) 2-quanidinobenzimidazole
(20) 4,6-dihydroxy-2-methylpyrimidine
(21) Lithium isonicotinate
(22) Potassium isonicotinate
(23) 3,4-dihydroxybenzoic acid
(24) 5,6-dimethylbenzimidazole
(25) 2-hydroxybenzimidazole
(26) 2,6-dihydroxypyridine hydrochloride
(27) 5,6-dichlorobenzimidazole
(28) 6-nitrobenzimidazole
(29) 4-amino-2,6-dihydroxypyrimidine
(30) 2-benzimidazoylurea
(31) 2-amino-4,6-dichloropyrimidine
(32) 5-chloro-2-methylbenzimidazole
(33) 2,4-quinolinediol
(34) 2-hydroxy-3-naphthoic acid hydrazide
(35) 4-hydroxyquinazoline
(36) 2-phenylbenzimidazole
(37) 5-vanillylidenebarbituric acid
(38) 2-pyrazine carboxylic acid
(39) 6-nitrobenzimidazole, sodium salt
(40) Hypoxanthine
(41) 2,5,6-trimethylbenzimidazole
(42) Trichloromelamine
(43) Xanthopterin monohydrate (2-amino-4,6-pteridinediol)
(44) 3-nitropyrimidazole
(45) Blue tetrazolium
(46) Pterin-6-carboxylic acid
(47) 5-nitroindazole
(48) 6-nitroindazole
(49) 7-nitroindazole
(50) Indazole
(51) 4-nitroindazole
(52) 3,4-diaminobenzoic acid

(53) 3-amino-1,2,4-triazine
(54) 2-imidazolidone
(55) 2,4-diamino-6-phenyl-s-triazine
(56) 4,6-diamino-2-methyl-mercaptopyrimidine
(57) 4,5-diamino-6-hydroxy-pyrimidine sulfate
(58) 3,5-diamino-1,2,4-triazole
(59) 3,3'-diaminobenzidine
(60) 6-nitrobenzimidazole The active nucleation agents can be incorporated in the vinylidene chloride polymer in effective amounts in a variety of manners. Generally effective amounts are from about 0.005 weight percent to about 5 weight percent, the weight percent being based on the combined weight of the nucleator and the vinylidene chloride polymer.

In ultimate compositions consisting essentially of the vinylidene chloride polymer and the nucleator, from about 0.01 to about 1.0 percent by weight of added nucleation agent, based on the vinylidene chloride polymer weight is preferred, depending on other factors as indicated below. In compositions also containing added stabilizers, plasticizers, pigments, fillers, mold release agents and the like, a larger proportionate amount of nucleating agent may be required to produce the desired effect.

The particle size of the added nucleating agent is not critical from the standpoint of the qualitative effect on nucleation. In general, small particle size is preferred for ease of obtaining intimate mixing and thorough distribution through the vinylidene chloride polymer. Usually, the smaller the particle size the less nucleator is needed to provide a desired effect on crystallization, and better clarity of transparent polymer compositions is obtained with smaller particles. However, it is the ultimate particle size which is controlling, rather than the starting size of the material used, since some nucleation materials undergo further subdivision during fabrication of the plastic composition. In instances where optical properties of the product are not important, e.g., in opaque pigmented or filled articles, or where the index of refraction of the nucleator is nearly the same as that of the vinylidene chloride polymer or where the starting particles of nucleation agent break down to small ultimate particles during fabrication, the nucleating agent particles can be relatively larger. In practice, nucleators passing an 80 mesh screen (U.S. Sstandard Sieve Series), less than about 175 microns, are suitable for most applications. Particles in the order of 5 microns or smaller up to about 800 microns can be used.

The added nucleation agents are incorporated into the polymer by conventional mixing means. Finely divided nucleator and finely divided polymer can be mechanically admixed, or the polymer can be dissolved in a liquid solvent, followed by adding the finely divided nucleator to the polymeric solution, and evaporating the solvent from an intimate mixture of polymer and nucleator. Another procedure is to thoroughly admix the finely divided nucleating agent with the vinylidene chloride polymer in heat plastified or melted condition.

The advantages of the present invention are obtained when a composition, comprising an intimate admixture of a thermoplastic, normally crystalline vinylidene chloride polymer as described herein and an effective proportionate amount of a nucleation agent is maintained at a temperature above the crystalline melting point of the polymer but below the decomposition temperature of the ingredients of the mixture, then cooled to a temperature below the crystalline melting point of the polymer. The absolute temperatures are not critical provided the relative temperatures are respected in consideration of the particular polymer and nucleating agent employed, and in turn, the nucleating agent must be selected in consideration of the temperatures necessary to put the particular polymer in molten condition; that is, the particular nucleation agent used must be thermally stable above the polymer melting point, and the nucleator must exist at least in part in a sterically regular configuration when the temperature of the composition is cooled below the crystalline melting point of the polymer.

It is within the ordinary skill of the art to select the optimum rate of cooling of the nucleated polymer composition from a temperature above the crystalline melting point of the polymer to temperatures below such point in consideration of the particular kind of polymer and kind and proportion of nucleating agent present in the composition and the crystalline structure desired in the polymeric product. In general, nucleated compositions in accordance with this invention crystallize at a higher temperature (less supercooling) and at higher rates (from more centers of nucleation) than do otherwise similar compositions absent the added nucleation agent. However, with slow crystallizing polymers, an ultra-fast cooling rate may mask or diminish the benefits of this invention in some instances.

For the fabrication of useful articles, the nucleated composition is made up at a temperature above the crystalline melting point of the polymer but below the decomposition point of the ingredients of the composition, as before described, or is reheated to such temperature, and while in heat plastified condition, is fabricated into useful or potentially useful shapes such as fibers, filaments, films, sheets, rods, tubes or other extruded articles, or is molded into articles and subsequently cooled to set up the shape and induce crystallization. In a particular embodiment, a heat plastified nucleated polymeric composition as herein described is melt extruded through a long narrow slit die into a film which is carried over cooling rolls or through cooling baths of liquid or gas for controlled temperature conditioning until crystallization has occurred, then cooled to room temperature and taken to storage. In another particular embodiment, a heat plastified nucleated polymeric composition of the kind herein described is pressed by compression or injection into a mold space and cooled at a predetermined rate in the mold until the mass is set up and crystallized after which the mold is opened and the molded article ejected.

In yet another embodiment a solution or dispersion of the nucleated copolymer may be utilized as a coating material, as mentioned supra.

In the following experiments the nucleating ability of the specified agents is determined in a differential scanning calorimeter. It is well known in the art that the calorimetric techniques provides a convenient means of measuring the effectiveness of nucleating agents in crystalline polymers. U.S. 3,367,926 discloses such a procedure and is herewith incorporated by reference thereto. In the following experiments all thermal measurements are made on a Perkin-Elmer differential scanning calorimeter Model DSC-1. The experimental procedure employed was to first form an admixture of vinylidene chloride polymer in powder form with a nucleating agent. The admixture was then heated in the differential scanning calorimeter at a rate of 20° C. per minute from an initial temperature of about 97° C. to a temperature within the range of about 187° C. to about 197° C. The maximum temperature employed depends upon the melting point and the decomposition temperature of the particular polymer composition. The mixture was then cooled immediately at a rate of 20° C. per minute until crystallization occurred as evidenced by an exotherm. The peak of the exotherm, i.e., the point of intersection of tangents to the exothermic curve was recorded as the freezing point $T_p$.

Example I

Employing the foregoing procedure, the freezing points for compositions of a series of vinylidene chloride-vinyl chloride copolymers, as identified in the following Table II, in admixture with various compounds suitable as nucleators in the present invention (as set forth in Table I), are obtained and tabulated in Table III.

TABLE II.—COPOLYMER PROPERTIES

| Copolymer designation: | Percent VeCl² ª | Percent VCl ᵇ | Max. temp., °Kelvin ᶜ | Relative viscosity ᵈ |
|---|---|---|---|---|
| A | 92-93 | 7-8 | 470 | 1.74 |
| B | 89-91 | ᵉ 9-11 | 460 | 1.53 |
| C | 89-91 | ᶠ 9-11 | 470 | 1.49 |
| D | 87-88 | 12-13 | 460 | 1.53 |

ª Vinylidene chloride.
ᵇ Vinyl chloride.
ᶜ Maximum temperature during melting-freezing cycle.
ᵈ 2% solution in o-dichlorobenzene at 140° C.
ᵉ Plus approximately 12-15% stabilizers and plasticizers.
ᶠ Plus approximately 2% dinonyl adipate plasticizer.

TABLE III $T_p$ Values (° C.)

| Nucleating agent: | Copolymer type A | B | C | D |
|---|---|---|---|---|
| None | 114 | 79 | 76 | <65 |
| (1) | 137 | | | |
| (2) | 122 | | | |
| (3) | 126 | 92 | 86 | <65 |
| (4) | 128 | | | |
| (5) | 130 | | | |
| (6) | 127 | | | |
| (7) | 126 | | | |
| (8) | 123 | | | |
| (9) | 130 | | | |
| (10) | 130 | | | |
| (11) | 129 | | | |
| (12) | 123 | | | |
| (13) | 132 | 105 | 116 | 97 |
| (14) | 125 | | | |
| (15) | 123 | | | |
| (16) | 122 | | | |
| (17) | 123 | | | |
| (18) | 123 | | | |
| (19) | 132 | | | |
| (20) | 130 | | | |
| (21) | 133 | 92 | 109 | 85 |
| (22) | 130 | 90 | 104 | <65 |
| (23) | 123 | | | |
| (24) | 126 | 99 | 108 | 85 |
| (25) | 133 | 100 | 98 | <65 |
| (26) | 122 | | | |
| (27) | 132 | 97 | 106 | 98 |
| (28) | 134 | 102 | 101 | 66 |
| (29) | 131 | | | |
| (30) | 127 | 95 | 118 | <65 |
| (31) | 122 | | | |
| (32) | 127 | 94 | 107 | 83 |
| (33) | 127 | | | |
| (34) | 128 | 97 | 112 | 93 |
| (35) | 123 | | | |
| (36) | 131 | 95 | 111 | 95 |
| (37) | 126 | | | |
| (38) | 123 | | | |
| (39) | 134 | 120 | 111 | 99 |
| (40) | 124 | | | |
| (41) | 126 | 90 | 105 | 91 |
| (42) | 133 | 109 | 117 | 95 |
| (43) | 129 | | | |
| (44) | 130 | 79 | 97 | <65 |
| (45) | 126 | | | |
| (46) | 123 | | | |
| (47) | 133 | 85 | 113 | <65 |
| (48) | 134 | 101 | 112 | 95 |
| (49) | 134 | 82 | 97 | <65 |
| (50) | 126 | 90 | <65 | <65 |
| (51) | 132 | 89 | 113 | <65 |

Of the compounds listed in Table III above the following are most effective as nucleating agents for the designated vinylidene chloride polymers and are prepared for the purposes of the present invention: melamine (13), trichloromelamine (42), 5,6-dichlorobenzimidazole (27), 2-phenylbenzimidazole (36), 6-nitrobenzimidazole sodium salt (39), 6-nitroindazole (48), lithium isonicotinate (21), and 6-nitrobenzimidazole (28).

Example II

A series of compounds, taken from those listed in Table I, were examined for their effect on the precipitation of polyvinylidene chloride from solutions in methyl-2-pyrrolidone or 1-acetylpiperidine. The compounds were considered effective as nucleating agents if they caused the solution to become a rigid gel sooner than the control (absent a nucleating agent). In such experiments one to two milliliters of a solution containing 5 percent by weight of polyvinylidene chloride in the designated solvent (previously prepared by mixing the powdered polymer with the solvent at 70 to 77° C. until dissolved, followed by cooling to room temperature) was placed in small corked vials with several milligrams of compound (nucleating agent) maintained at 23° C. The viscosities of the mixtures were compared periodically. The following Table IV illustrates the materials used and the results obtained.

TABLE IV

| Compound | Appearance in N-methyl-2-pyrrolidone after— 3.7 hours | 4.7 hours |
|---|---|---|
| Control (no additive). | Fluid | Fluid |
| (52) | Fluid | Rigid gel |
| (53) | Fluid | Almost rigid gel |
| (54) | Very thick | Rigid gel |
| (55) | Very thick | Rigid gel |
| (56) | Rigid gel | Rigid gel |
| (57) | Fluid | Very viscous |
| (58) | Rigid gel | Rigid gel |
| (59) | Fluid | Viscous |
| (42) | Fluid | Very viscous |

| Compound | Appearance in 1-acetylpiperidine after— 18.8 hrs. | 24¼ hrs. | 43.2 hrs. | 99¾ hrs. |
|---|---|---|---|---|
| Control (no additive). | Liquid | Liquid | Liquid | Rigid gel. |
| (60) | do | do | Rigid gel | Do. |
| (27) | Almost gelled. | Rigid gel | do | Do. |

What is claimed is:

1. In a process for fabricating articles from a normally crystalline vinylidene chloride polymer containing at least about 70 percent by weight vinylidene chloride, in the polymer molecule with any remainder being vinyl chloride, which polymer on cooling from a molten condition tends to supercool without crystallization to temperatures substantially below its crystalline melting point, the improvement which comprises modifying the crystalline structure of the polymer in such fabricated articles by compounding a composition consisting of from about 99.995 to about 95 parts by weight of such normally crystalline vinylidene chloride polymer and a nucleation effective proportionate amount of from about 0.005 and about 5 parts by weight of an added nucleation agent which is chemically stable at temperatures above the crystalline melting point of the normally crystalline vinylidene chloride polymer and possesses a sterically regular structure at temperatures below the crystallization melting point of the normally crystalline vinylidene chloride polymer and which nucleation agent is melamine, the composition being heated to a temperature above the crystalline melting point of the normally crystalline vinylidene chloride polymer but below the decomposition temperature of the ingredients of the composition, shaping the composition and cooling the same to a temperature below the crystalline melting point of the normally crystalline vinylidene chloride polymer, and crystallizing said polymer, the added nucleation agent being present in the crystallizing composition as solid particles having a particle size of from about 5 to about 800 microns.

2. The improvement according to claim 1 wherein the normally crystalline vinylidene chloride polymer is polyvinylidene chloride.

3. In a process for fabricating articles from a normally crystalline vinylidene chloride polymer containing at least about 70 percent by weight vinylidene chloride in the polymer molecule with any remainder being vinyl chloride, which polymer on cooling from a molten condition tends to supercool without crystallization to temperatures substantially below its crystalline melting point, the improvement which comprises modifying the crystalline structure of the polymer in such fabricated articles by compounding a composition consisting of from about 99.995 to about 95 parts by weight of such normally crystalline vinylidene chloride polymer and a nucleation effective proportionate amount of from about 0.005 and about 5 parts by weight of an added nucleation agent which is chemically stable at temperatures above the crystalline melting point of the normally crystalline vinylidene chloride polymer and possesses a sterically regular structure at temperatures below the crystallization melting point of the normally crystalline vinylidene chloride polymer and which nucleation agent is selected from the group consisting of melamine and trichloromelamine, the composition being heated to a temperature above the crystalline melting point of the noramlly crystalline vinylidene chloride polymer but below the decomposition temperature of the ingredients of the composition, shaping the composition and cooling the same to a temperature below the crystalline melting point of the normally crystalline vinylidene chloride polymer, and crystallizing said polymer, the added nucleation agent being present in the crystallizing composition as solid particles having a particle size of from about 5 to about 800 microns.

4. The improvement according to claim 3 wherein the normally crystalline vinylidene chloride polymer is polyvinylidene chloride.

References Cited
UNITED STATES PATENTS

| | | | |
|---|---|---|---|
| 3,075,946 | 1/1963 | Zupic | 260—897 C |
| 3,666,715 | 5/1972 | Kutner | 260—45.8 NT |
| 3,275,716 | 9/1966 | Wiggins | 260—899 |
| 3,084,135 | 4/1963 | Scullin | 260—45.8 NT |
| 2,224,944 | 12/1940 | Young | 260—45.8 NT |

MORRIS LIEBMAN, Primary Examiner

P. R. MICHL, Assistant Examiner

U.S. Cl. X.R.

260—41 C, 87.7, 847, DIG. 35